July 14, 1931.  H. A. W. WOOD  1,814,578
STEREOTYPE PLATE TRIMMING MACHINE
Original Filed Nov. 23, 1925    2 Sheets-Sheet 1
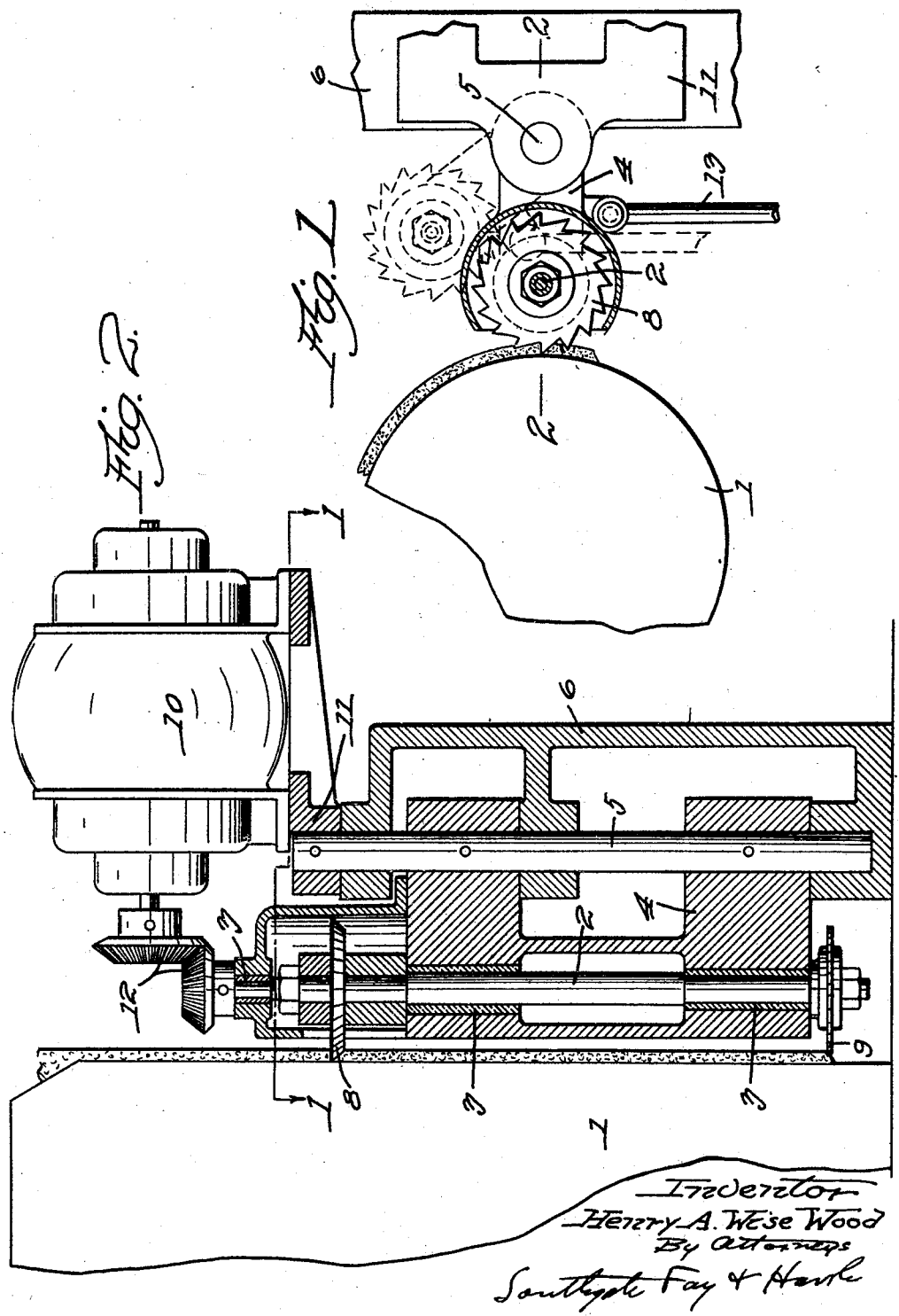

July 14, 1931. H. A. W. WOOD 1,814,578
STEREOTYPE PLATE TRIMMING MACHINE
Original Filed Nov. 23, 1925 2 Sheets-Sheet 2
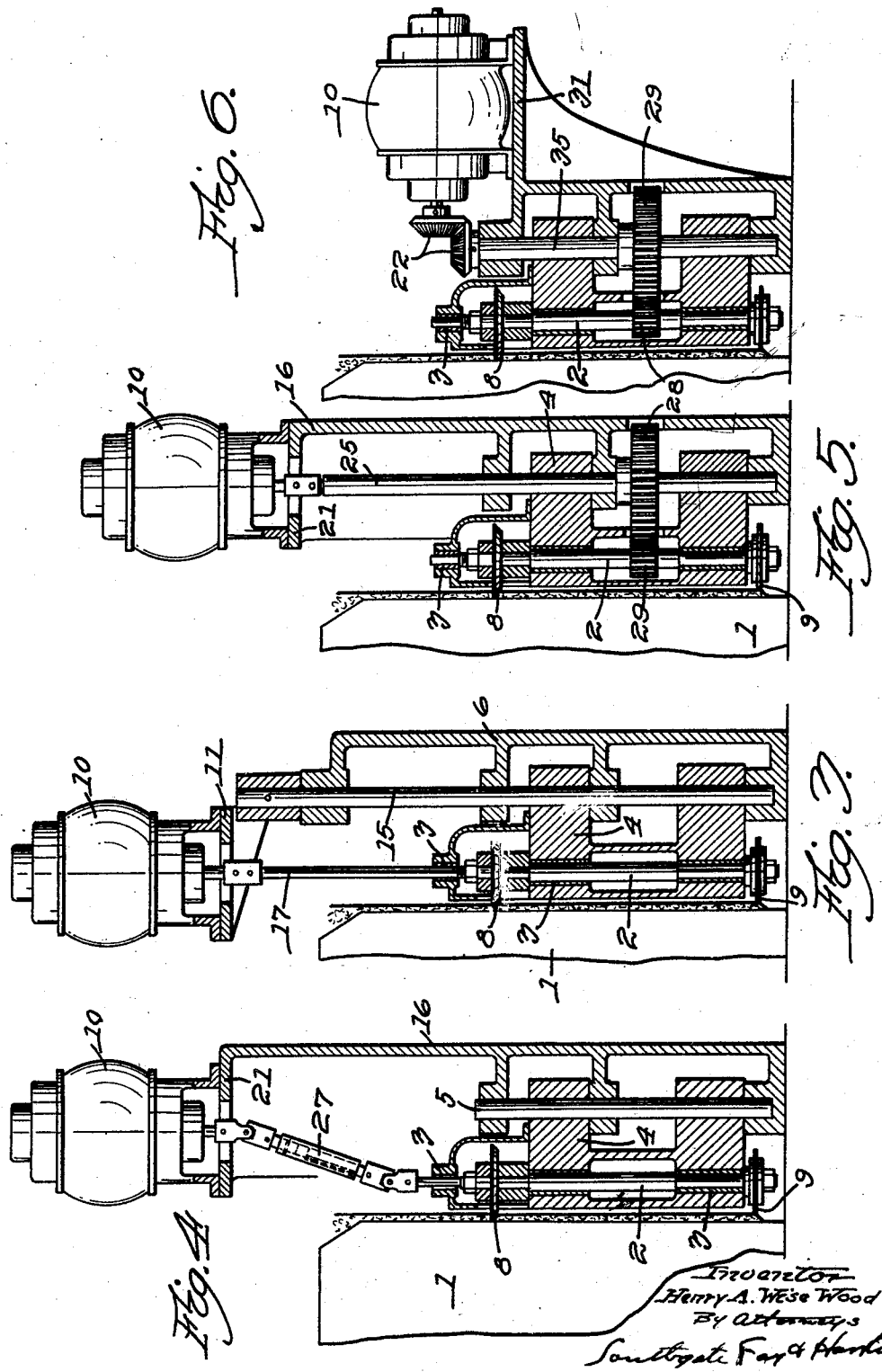

Patented July 14, 1931

1,814,578

UNITED STATES PATENT OFFICE

HENRY A. WISE WOOD, OF NEW YORK, N. Y., ASSIGNOR TO WOOD NEWSPAPER MACHINERY CORPORATION, OF NEW YORK, N. Y., A CORPORATION OF VIRGINIA

STEREOTYPE PLATE TRIMMING MACHINE

Application filed November 23, 1925, Serial No. 71,015. Renewed December 11, 1930.

This invention relates to the trimming of a stereotype printing plate cast on a core which rotates on its own axis to deliver the plate from the mold and which is provided with one or more saws for trimming the ends of the plate as the core rotates to deliver. The principal objects of this invention are to provide for driving the saw shaft in such a way as to eliminate the inconvenient and awkward drives that have been used heretofore; to avoid the necessity of providing for multiplying the speed; and to permit of direct operation of the saws at the high speeds required for this work.

Other objects and advantages of the invention will appear hereinafter.

Reference is to be had to the accompanying drawings in which

Fig. 1 is a plan of a part of a stereotype plate trimming machine with parts in section on the line 1—1 of Fig. 2, showing a preferred embodiment of this invention;

Fig. 2 is a sectional view on the line 2—2 of Fig. 1; and

Figs. 3, 4, 5 and 6 are views similar to Fig. 2 showing other forms in which this invention can be carried out.

This invention is designed especially for application to the so called Junior Autoplate machine for producing stereotype printing plates, but is not strictly limited to that machine. In that machine after the plate is cast, the core is given a half revolution on its own vertical axis which carries the newly cast plate past the trimming saws, one of which cuts the tail or riser from the upper end of the plate and the other, if used, trims off the fins, if any, at the bottom edge of the plate. The trimming operation is simultaneous with the delivery of the plate to the back of the mold.

The saw spindle has been driven heretofore by means of belts or gears which receive their power from some other part of the machine. As the saw spindle is vertical, this necessitates a vertical belt construction. This, together with the extremely high speeds necessary for the proper operation of these cutters, renders the drive comparatively inefficient, a fact that is well known. It is also necessary to speed up the drive from a comparatively slow running shaft to the high speed necessary, which also is an undesirable feature. Furthermore, the frame on which the saw spindle is mounted has to be swung toward and from the core which makes an extremely awkward and undesirable design. This invention is designed to eliminate these several disadvantages as will appear.

Referring first to Figs. 1 and 2, I have provided a core 1, which, as usual constitutes a part of the mold in a machine of this character, and is arranged vertically. The core rotates on its own vertical axis for the purpose of delivering the plate out of the mold and around on the back side where it can be removed. In order to avoid the above mentioned difficulties, I provide a separate and self-contained plate trimming unit. This unit comprises a standard 6 which can be fastened to the base of the machine and acts as a support for every feature of the saw trimming mechanism. On this standard I provide a shaft 5 arranged vertically in this instance and, in any case, parallel with the axis of the core 1. On this shaft I locate a frame 4. This frame is arranged to swing about the axis of the shaft 5. In the form shown in these two figures, it is pinned to it so as to swing not only about it but with it. This frame carries the saw spindle 2 which is parallel with the axes of the core and the shaft 5. This spindle is mounted in bearings 3 in the frame 4. On the saw spindle are located a tail cutting saw 8 and a trimming saw 9, if the latter is used, and these are arranged in the usual way.

It will be understood that what I have called the shaft 5 may take the form of an ordinary pin acting merely as a hinge on which the frame 4 swings or a revolving shaft connected with the power. In the form shown in Figs. 1 and 2, it is pinned to the frame 4 and also has pinned to it a bracket 11, which in this case extends from it in a direction opposite to that of the frame 4. Thus these two parts tend to counterbalance each other, especially when the bracket 11 is provided with the operating motor 10. They always swing together. The motor is provided with gearing 12 directly connected with the spindle 2 to operate it.

It will be seen that whatever the position of the frame 4 about the shaft 5, the motor 10 will always be directly connected with the spindle 2 for operating it so that the changes in the position of the frame will not necessitate any adjustments of the driving mechanism and neither will they necessitate any complications in the connections of the parts. The frame 4 is swung back and forth in the usual way by means of a link 13 operated in any desired way.

Fig. 1 shows the frame in trimming position in full lines and shows it in dotted lines in the position it assumes when the casting is being made or in fact at any time when the saws are not in operation.

Now, referring to the second sheet of drawings, I have shown four other forms in which this invention can be made and have used the same reference numerals wherever they apply without any change. In Fig. 3 the conditions are very similar to those shown in Fig. 1 as the shaft 15 is provided in the same place and has the frame 4 keyed to it and also on the bracket 11. In this case, the bracket is on the same side of the shaft 15 as the frame 4 so that the motor 10, which in this case is vertical instead of horizontal, will have its shaft coupled directly to an extension 17 on the shaft 2. In this case, the action and operation are exactly the same as in Fig. 2 except that the motor and its bracket do not assist in counterbalancing the frame 4 but bring all the weight on one side of the shaft 15.

In Fig. 4, I have shown the standard 16 as elongated so as to provide a shelf 21 at the top constituting a stationary part of the standard for supporting the motor. In this case the shaft of the motor is connected by a flexible shaft 27 to the saw spindle 2. Here the shaft 5 does not need to be pinned to the frame 4, but it can be. It simply acts as a hinge in either case.

In the form shown in Fig. 5, a standard 16 is used substantially as in Fig. 4, and the support 21 for the motor 10 is the same. But here the shaft 25, which takes the place of the shaft 5 or 15, is directly connected itself to the motor shaft. It is provided with a gear 28 meshing with a gear or pinion 29 on the shaft 2 for operating it. In this case of course, the frame 4 is loose on the shaft 25 and there is an increase in the speed transmission to the shaft 2 if the gears 28 and 29 are designed as shown.

The conditions are exactly the same in Fig. 6 except that the motor 10 is horizontal and by gearing 22 drives the shaft 35 which is the same as the shaft 25 except that now it does not have to be so long. The gears 28 and 29 are used as in Fig. 5 and there is a shelf 31 on the standard for supporting the motor 10 in a horizontal position.

In the forms shown in Figs. 4, 5 and 6, the motor remains stationary while the saw spindle can be swung to and from the cylinder as previously described. A driving connection is maintained between the motor and the saw spindle at all times. In the forms shown in Figs. 5 and 6, the shaft which acts as a hinge for the saw spindle frame also acts as a means for transmitting the power from the motor to the saw spindle.

It will be seen therefore, that by the use of any one of the several forms of the invention shown, a mechanism is provided which delivers power directly from a high speed motor to a high speed spindle without the use of any intermediate gearing except a mere pair of gears in some cases, and without the use of any vertical high speed belts. It is therefore possible to secure higher efficiency than has been obtained heretofore and avoid awkwardness in design.

Although I have illustrated and described only a few forms of this invention, I am aware of the fact that it can be carried out in other ways without departing from the scope of the invention as expressed in the claims.

Therefore I do not wish to be limited in these respects, but what I claim is:—

1. In a printing plate trimming machine, the combination with a core on which the stereotype plates are cast rotatable on its axis, of a frame pivoted on an axis parallel to the axis of the core to swing toward and from the surface of the core, a saw spindle mounted on said frame, a trimming saw on said spindle, and an electric motor directly connected to the saw spindle, whereby the cast plate will be trimmed by the rotation of the core.

2. In a stereotype plate trimming machine, the combination with the core on which the plate is cast, said core being mounted to turn on a vertical axis, of a plate trimming unit comprising a stationary standard, a vertical shaft carried by said standard and located beyond the cylindrical surface of the core, a frame mounted to swing about the axis of said shaft, a vertical saw spindle supported on said frame, a saw on the saw spindle for trimming the end of the plate, a motor supported by said standard, and means for directly connecting the motor with the saw spindle.

3. In a stereotype plate trimming machine, the combination with a rotary core on which the stereotype plate is cast, of a frame pivoted to swing on an axis parallel to the length of the core, a parallel spindle on said frame, trimming saws carried by the spindle, a bracket adapted to swing with said frame, a motor on said bracket, and means for connecting the motor with the trimming saw spindle for operating it.

4. In a machine for trimming stereotype printing plates, the combination with the core on which the plate is cast located to turn, of a shaft, a frame fixed to said shaft to swing therewith, a saw spindle carried by said frame, saws on the saw spindle for trimming the plate, a bracket fixed on the shaft on the side opposite said frame, and a motor carried by the bracket and direct connected with the saw spindle, whereby the frame and bracket will swing with the shaft and tend to counter-balance each other and the motor will remain always in the same relation to the saw spindle.

5. In a stereotype plate trimming machine, the combination with a core on which the plate is cast, said core being mounted to turn, of a shaft, a frame mounted to swing with said shaft, a bracket fixed with respect to said shaft to swing with it, a saw spindle on said frame, saws on the saw spindle for trimming the plate, a motor on the bracket, and means for directly connecting the motor with the saw spindle for driving the saws.

6. In a printing plate trimming machine, the combination with a rotatable core on which the stereotype plates are cast, a shaft, of a frame pivoted on said shaft on the axis thereof parallel to the axis of the core to swing toward and from the surface of the core, a saw spindle mounted on said frame, trimming saws on said spindle, a bracket mounted on said shaft and an electric motor mounted on said bracket directly connected to the saw spindle and swinging with said saws.

7. In a stereotype plate trimming machine, the combination with a core on which the plate is cast, said core being mounted to turn on an axis, of a plate trimming unit comprising a stationary standard, a shaft carried by said standard, a frame mounted to swing about the axis of said shaft, a saw spindle supported on said frame, a saw on the saw spindle for trimming the end of the plate, a bracket mounted to swing about the shaft, a motor supported by the bracket, said frame and bracket and motor carried thereby swinging simultaneously about the shaft, and means for directly connecting the motor with the saw spindle.

8. In a printing plate trimming machine, the combination with a core on which the stereotype plates are cast, said core being rotatable on its axis, of a frame adapted to move towards and away from the said core, a saw spindle mounted on said frame carrying a trimming saw, and an electric motor directly connected to the said saw spindle whereby the cast plate will be trimmed by the rotation of the core.

In testimony whereof I have hereunto affixed my signature.

HENRY A. WISE WOOD.